June 4, 1963  C. R. CUMMINS  3,091,851
CAST CUTTER
Filed May 28, 1962  2 Sheets-Sheet 1
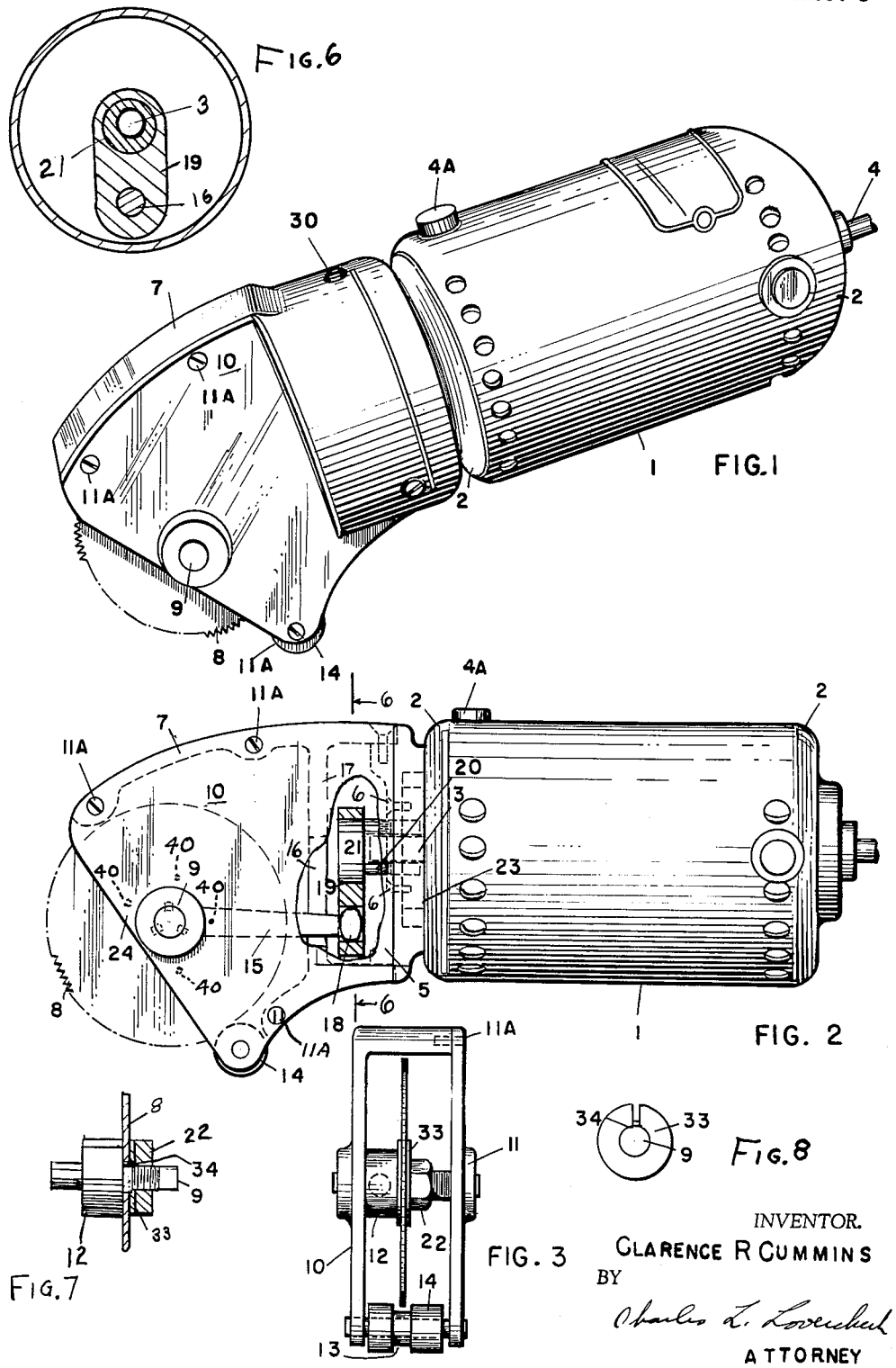
INVENTOR.
CLARENCE R CUMMINS
BY
Charles L. Lovercheck
ATTORNEY

INVENTOR.
CLARENCE R CUMMINS
BY
ATTORNEY

United States Patent Office 3,091,851
Patented June 4, 1963

3,091,851
CAST CUTTER
Clarence R. Cummins, Erie, Pa., assignor of forty percent to Thomas B. Dempsey, Erie, Pa.
Filed May 28, 1962, Ser. No. 198,146
8 Claims. (Cl. 30—167)

This invention is intended to provide an improved power cutter for use in the removal of surgical casts composed of plaster or other materials.

The oscillating cutting blade, an integral component of this device, while effective in cutting rigid or rigidly held materials, will not cut upon contact with anything sufficiently loose to oscillate with the cutting blade.

The term "cutter blade" instead of "saw" is used herein to differentiate between the teeth of a conventional hand or power drive saw and the V-shaped teeth of the cutter blade. In the latter, the teeth are set and sharpened to cut in both directions rather than in one direction as with the conventional hand or power saw.

With the cast cutter disclosed herein, the cutter blade is directly in line with the motor which acts as a handle and, so positioned, materially aids in controlling the line of cutting.

A slotted roller shown mounted between the sides of the cutter blade housing acts as a saw table holding any loosened outer layers of the cast rigid on the upward stroke of the cutter blade. On the downward stroke, loosened outer layers of the cast would be held rigid against the body of the cast. A slot in the heel of the cutter housing would serve the same purpose as the roller. The slotted roller or the heel of the cutter housing acts as a fulcrum for tilting the handle which controls the depth of the cut.

A thumb controlled momentary switch which is conveniently located at the front end of the handle feeds electric current to the motor. A slight pressure of the the thumb activates the cutter blade. Upon release of the thumb pressure, the cutter blade becomes inactive.

In this invention, the cutter housing with the vacuum attachment collects the dust and small particles created during the act of cutting the cast, thereby clearing the vision of the operator, dispensing with any need for a face mask, and eliminating a cleaning effort when the cast removing job is completed.

In order that the vacuum hose may be out of the operator's way, cutter housings will be cast both right and left handed in order that the removable side of the housing will be on the opposite side from the operator. This selection may be at the option of the purchaser.

To damp the high pitched noise caused by the high speed oscillation of the cutter blade, a heavy felt washer is built into the forward motor mounting plate. This is an important feature where the sensitivity of the patient is to be considered.

Oscillating cutters of various types for a variety of cutting purposes have been marketed for many years; however, this invention presents an entirely new concept in surgical cast cutters, both in mechanical design and improvement features.

It is, accordingly, an object of the present invention to provide an improved cast cutter.

Another object of the invention is to provide a cast cutter which is simple in construction, economical to manufacture, and simple and efficient to use.

Still another object of the invention is to provide an improved cutting member actuating mechanism.

A further object of the invention is to provide an improved cast cutter in combination with a dust collecting means.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

In the drawings:

FIG. 1 is an isometric view of a surgical cast cutter according to the invention;

FIG. 2 is a side view of the cast cutter shown in FIG. 1;

FIG. 3 is an end view of the cast cutter;

FIG. 6 is a cross sectional view taken on line 6—6 of FIG. 2;

FIG. 7 is a cross sectional view of the rocker arm shaft and mountings; and

FIG. 8 is a view of the split washer which engages the same keyway as the cutter blade, the washer preventing loosening of the lock nut.

Figure 4:
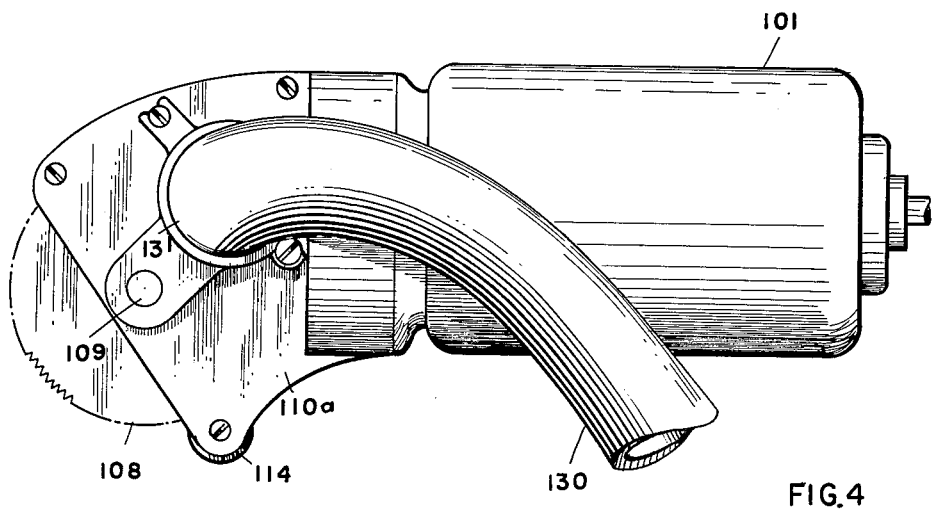
FIG. 4 is a side view of another embodiment of the invention.

Now with more specific reference to the drawings, FIG. 1 shows a cast cutter having a motor 1 provided with removable end frames 2 in which is journalled a motor shaft 3. The outside diameter of the motor 1 is such that it can be conveniently grasped by the hand of an operator and serves as the handle of the cast cutter.

An electrical connection to the motor 1 is made through a cord 4 at the rear end of the motor. A thumb controlled momentary switch is located near the front of the motor housing. This allows the motor to operate only while the cutter blade is cutting and thereby reduces heating to a minimum.

The cutter housing can be rotated so that there are, in effect, three alternate positions for the switch button, underneath or at either side of the motor housing. Change is easily effected by removing the four screws 30 and turning the cutter housing to matching screw holes in a mounting plate 5.

The motor shaft 3 projects through the mounting plate 5 fixed to the motor end frame 2 by screws 6. A hollow housing 7 is removably attached to the end frame 2 by means of the screws 30. A circular cutter blade 8 is keyed to an arbor 9 journalled crosswise in side walls 10 and 11. The cutter blade 8 is readily replaceable by loosening screws 11A and removing the side wall 11.

The cutter blade 8 may be turned on its arbor so as to present a fresh cutting edge by loosening a nut 22. The position of the cutter blade is held on its keyway by a washer 33 which engages a key 34. Holes 40 can be formed in the cutter blade and a similar hole can be formed in an arm 15. A pin can be extended through the hole in the arm 15 and through another hole in the cutter blade to further hold the cutter blade against rotation relative to the arm. This could be used instead of the keyway and key.

The cutter blade 8 oscillates in a circumferential groove 13 in a roller 14 journalled crosswise in the side walls 10 and 11.

Considering the motor 1 as the handle, the cutter blade 8 lies in a plane extending lengthwise of the handle and is journalled on an axis in front and extending crosswise of the handle somewhat below the center line of the handle. The roller 14 is journalled on a similar axis below and to the rear of the axis of the cutter blade. Both the roller 14 and the cutter blade 8 are between the side walls 10 and 11 and the cutting edge of the blade is in line with the handle.

Fixed on the cutter blade arbor 9 is the rocker arm 15 which extends back through an opening 16 in a cross web 17 and terminates in a ball and socket universal joint 18 in a link 19. A cam 21 rotates in the link 19. The cam 21 has a bored boss 20 which is fixed to the motor shaft 3.

During rotation of the motor shaft 3, the link 19 has an up and down movement in the plane of the motor shaft and universal joint 18 and a sidewise movement transverse to this plane which results in a rocking of the link 19 about the universal joint. The up and down movement, which is the driving movement, is effective to rock the rocker arm 15 fixed to the arbor 9 and to thereby produce an oscillatory movement of the cutter blade.

In a practical cutter, the motor under load runs at approximately four thousand revolutions per minute and the blade oscillates approximately one-four of an inch at its outer edge. During the use of the cutter, a high pitched noise is caused by high speed oscillation. This noise is materially reduced by a felt washer 23 for which space is provided in the front motor end frame 2. The felt washer deadens or damps noise. This is an important feature in cast cutters where the sensitivity of the patient must be taken into consideration.

In the use of the cast cutter, the roller 14 is rested on the surface of the cast slightly to the rear of the point at which the cut is to start and the motor or handle 1 is tilted to bring the blade 8 into contact with the cast. The depth of the cut may be controlled by the inclination of the handle, the depth being at maximum when surface 24 at the lower edges of the side walls 10 and 11 is parallel with and against the surface of the cast. This exceeds the depth of cut ordinarily needed.

The cast cutter is drawn toward the operator and can make long, straight cuts varying in depth at the will of the operator. If the oscillation of the blade loosens the upper or outer layers of the cast, the cutting is not interfered with since these layers are, in effect, alternately forced up against the roller 14 and down against the main body of the base.

Dust created during the cutting operation is diverted into the cutter blade housing and is removed by vacuum through a connecting tube.

Figure 5:
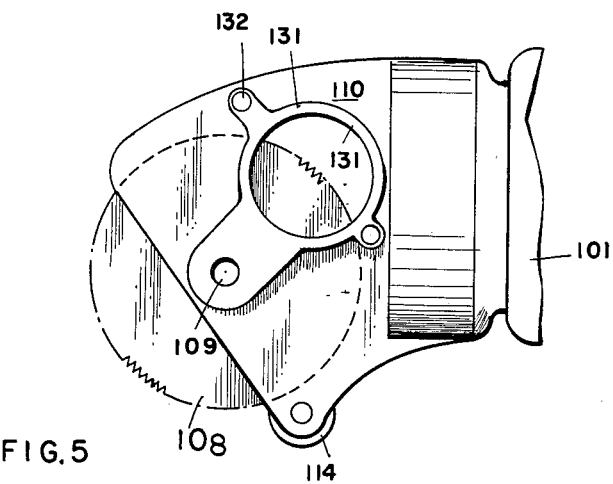
FIG. 5 is a partial view of the cast cutter shown in FIG. 4 with a part removed.

In the embodiment of the invention shown in FIGS. 4 and 5, a cutter assembly 101 is attached to a side frame 110 with a cutter blade 108 supported therein as in the embodiment shown in FIGS. 1, 2, and 3. A roller 114 is similar to the roller 14 in FIG. 1; however, the side frame 110 has a laterally extending tube 131 attached thereto by means of integral ears having screws 132 holding the tube in place. A source of vacuum can be attached to a tube 130 in order to draw dust and other foreign materials during operation of the cutter.

The side frame 110 is interchangeable with a side frame 110a in order to attach the vacuum tube 130—131. Likewise, cutter heads will be manufactured with the side 10 instead of the side 11 being made interchangeable so that cutters can be provided with the vacuum tube placed opposite to and out of the way of the operator.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A surgical cast cutter comprising an electric motor in the form of a generally cylindrical member of a size suitable to be received in the hand of a person, spaced, laterally extending side plates attached to one end of said motor and extending axially outwardly and downwardly therefrom, an oscillating cutter blade supported between said side plates on an axle, said axle having a rocker arm extending therefrom toward said motor, a link, a ball joint, said ball joint being received in one end of said rocker arm, said ball joint being received in one end of said link, and a cam fixed to the shaft of said motor, said cam being received in an opening in said link at the opposite end thereof from said ball joint whereby when said motor rotates, said cam oscillates said cutter blade.

2. The cast cutter recited in claim 1 wherein a thumb control switch is disposed on the outer periphery of said cylindrical member adjacent said side plates, said side plates being connected to said cylindrical member by means of a frame, said frame being secured to said cylindrical member whereby the relative position of said side plates to said cylindrical member can be changed relative to said thumb control switch.

3. A surgical cast cutter comprising a motor in the form of a generally cylindrical member of a size suitable to be received in the hand of a person, spaced, laterally extending side plates attached to one end of said motor and extending axially outwardly and downwardly therefrom, an eccentric, a cutting blade supported between said side plates on an axle, said axle having a rocker arm extending therefrom toward said motor, a ball joint on one end of said rocker arm, a link, said ball joint being received at one end of said link and said eccentric being received at the opening in the other end of said link, said eccentric being fixed to the shaft of said motor whereby when said motor rotates, said eccentric oscillates said cutting blade, and a roller attached between said side plates adjacent to said cutting blade and spaced from said motor, said roller being adapted to roll on a cast to provide a rest for said cutter during cutting operations.

4. A surgical cast cutter comprising a motor in the form of a generally cylindrical member of a size suitable to be received in the hand of a person, spaced, laterally extending side plates attached to one end of said motor and extending axially outwardly and downwardly therefrom, an oscillating cutting blade supported between said side plates on an axle, said axle having a lever extending therefrom toward said motor, an eccentric, a ball joint on one end of said lever, a link, said ball joint being received at one end of said link and said eccentric being received in the opening at the other end of said link, said eccentric being fixed to the shaft of said motor whereby when said motor rotates, said eccentric oscillates said cutting blade, one said side plate having a laterally extending tube attached thereto and communicating with the space between said plates, and a hose connecting a vacuum source thereto attached to said tube.

5. A surgical cast cutter comprising a motor adapted to be electrically powered, said motor being of a size suitable to be held in the hand of a person as a handle for said cutter, a momentary type switch mounting within said motor and operated by a switch button protruding therethrough and at the front of said motor convenient for finger tip control by said person, the forward end of said motor having a bearing for the shaft of said motor and carrying within said motor a heavy locked in felt washer to damp high pitched noises generated during operation of said cutter, said motor being removably attached to a cutter head divided into two compartments comprising a circular compartment adjacent the forward end of said motor containing an eccentric unit removably attached to the end of said motor shaft, a rocker arm having a ball end, a link unit connecting said eccentric unit to said ball end of said rocker arm, said rocker arm protruding through a web, said web dividing said compartments of said cutter head, said forward compartment being formed by two vertical parallel side plates extending axially forward of and downwardly from said motor, a hub axled between said side plates, and a circular cutting blade with a V-shaped teeth removably keyed to said hub, said ball end of said rocker arm being received within said circular compartment in one end of said link unit, thereby forming a ball and socket joint, the other end of said link unit receiving said eccentric unit attached to said motor shaft whereby when said motor shaft rotates, said eccentric unit oscillates said cutting blade.

6. The cast cutter recited in claim 5 wherein a roller is slotted to receive said cutting blade, said roller being attached between said side plates and adapted to roll on a cast and provide a table for said cutting blade on its upward oscillation.

7. The cast cutter recited in claim 5 wherein one said side plate of said cutter head has a laterally extending tube removably attached thereto and communicating with the space between said side plates, and a hose connecting a vacuum supply attached to said tube.

8. The cutter recited in claim 7 wherein said switch button which operates said momentary type switch is mounted within said motor housing, said switch button protruding through and at the front of said motor housing whereby it can be repositioned at any one of three alternate positions equally spaced around the periphery of said motor housing, said repositioning being accomplished by removing the screws which attach said motor housing to said cutter head and turning said cutter head to matching screw holes in said motor housing at the desired relocation.

References Cited in the file of this patent
UNITED STATES PATENTS

| | | |
|---|---|---|
| 1,942,766 | O'Banion | Jan. 9, 1934 |
| 2,367,432 | Reprogle | Jan. 16, 1945 |
| 2,522,006 | Wilcox | Sept. 12, 1950 |
| 2,617,186 | Pickles | Nov. 11, 1952 |